United States Patent [19]

Westerhof et al.

[11] Patent Number: 4,811,388
[45] Date of Patent: Mar. 7, 1989

[54] TELECOMMUNICATION NETWORK INCLUDING A CENTRAL BACK-UP MEMORY

[75] Inventors: Rudolphus H. W. M. Westerhof; Ruud A. S. Willemstein, both of Hilversum, Netherlands

[73] Assignee: U.S. Philips Corporation, New York, N.Y.

[21] Appl. No.: 87,183

[22] Filed: Aug. 19, 1987

[30] Foreign Application Priority Data

Sep. 10, 1986 [NL] Netherlands .................. 8602275

[51] Int. Cl.$^4$ .................. H04M 7/00; H04Q 3/545
[52] U.S. Cl. .................. 379/229; 379/207; 379/221; 379/279
[58] Field of Search .................. 379/207, 221, 34, 229, 379/279

[56] References Cited

U.S. PATENT DOCUMENTS

| | | | |
|---|---|---|---|
| 3,591,724 | 7/1971 | Yalsu et al. | 379/221 X |
| 4,284,852 | 8/1981 | Szybicki et al. | 379/221 |
| 4,575,839 | 3/1986 | Ogata et al. | 370/13 |

FOREIGN PATENT DOCUMENTS 0167591 8/1985 Japan .................. 379/221

OTHER PUBLICATIONS

"New Customer–Defined Network Service", McBerger et al., *Telephony*, Mar. 10, 1986, pp. 50, 52, 54, 58, 60.
"Private Networking with SOPHO-TBX and SOPHO S Systems", J. van Gelder et al., *Phillips Telecommunication Review*, vol. 43, No. 4, Dec. 1985, pp. 237–251.
"SOPHO S2500, the High–Range Communication Switch", M. Geelhoed et al., *Philips Telecommunication Review*, vol. 43, No. 2, Jun. 1985, pp. 92–113.

*Primary Examiner*—Thomas W. Brown
*Attorney, Agent, or Firm*—Thomas A. Briody; Jack E. Haken; Anne E. Barschall

[57] ABSTRACT

Telephone network comprised of a plurality of nodes which are coupled to each other by means of transmission lines, each node comprising a switching module, a central module and at least one peripheral module and an operational maintenance control unit, which can supply a command consisting of a sequence of sub-commands for changing the data in one or more nodes in the network being coupled to one of the nodes, there being coupled to one of the nodes a central back-up memory containing a network register for the sub-commands which are common to all the nodes of the network, local registers for specific sub-commands for always one node, one local register being provided for each node, and also a sequence number Table from which a unique sequence number can be assigned to each sub-command intended for storage either in the network register or in one of the local registers and a last relevant sequence number Table of the sub-command last registered for each of the node units being included, the sub-commands being stored in the relevant registers as soon as the operational maintenance command is produced by the control unit and before these sub-commands are transferred to the relevant node units.

19 Claims, 1 Drawing Sheet

TELECOMMUNICATION NETWORK INCLUDING A CENTRAL BACK-UP MEMORY

BACKGROUND OF THE INVENTION

1. Field of the Invention

The invention relates to a telecommunication network, more specifically a telephony network, comprising a plurality of nodes which are coupled to each other by means of transmission lines. Each node comprises a switching module, a central module and at least one peripheral module to which user ports can be connected. A control unit for operational maintenance is coupled to one of the nodes which unit can supply a command consisting of a sequence of sub-commands for modifying the data in one or more nodes in the network.

2. Prior Art

Such a telecommunication network is generally known and is used in, for example, company telephone exchanges. The network is then assembled from self-contained nodes each managing the variable and (semi)-permanent data of its "own" terminals connected to that node.

If now one wants to make changes, by means of operational maintenance, in the data file of one or more nodes, for example because a telephone connection associated with one node is to be "moved" to a different node, whilst maintaining its own set number and all further facilities associated with that set number, such as the possibility of trunk and international calls, it is imperative that a protection is provided which insures that during the "move", that is to say during the change in the data in the relevant nodes, no information is lost because of the fact that, for example, an interruption occurs in the transmission line between the node from which operational maintenance is to be effected and a node in which data must be changed. Such an interruption may be caused by "hardware" faults, such as faults in the equipment or a physical interruption of the transmission line.

SUMMARY OF THE INVENTION

The invention has for its object to provide a solution for this problem to ensure that the data in one or more nodes can be changed in a reliable manner without an interruption during the change procedure resulting in one or more sub-commands forming part of a change command not or not incorrectly being effected.

According to the invention, a telecommunication network of the type described in the Field of the Invention is therefore provided with a central back-up memory. The central back-up memory is coupled to one of the nodes and includes a network register for the sub-commands common to all the nodes of the network, and also local registers for the specific sub-commands for one node. One local register is provided for each node. The sub-commands are stored in the relevant registers as soon as the control unit supplies the operational maintenance command and before the sub-commands are transferred to the relevant nodes.

One central memory is thus always present in which the sub-commands are stored which either hold for all the nodes of the network or for one specific node. If now, during carrying out of a command by means of a plurality of sub-commands, an interruption occurs in the reception of the sub-commands by the node for which they are intended, these sub-commands can as yet be carried out at a later instant since the sub-commands intended for that node have been stored in the central back-up memory. Of course provisions must be made by means of which it is possible to determine which sub-command was received last by the node in which the disturbance occurs, and also for ascertaining which sub-commands must as yet be transferred from the central back-up memory to that node. So as to provide a solution also for this problem, according to a preferred embodiment of the invention, a table of sequence numbers SN is included in the central back-up memory, from the table SN, a unique sequence number can be assigned to each sub-command intended for storage in either the network register or in one of the local registers of the back-up memory. The central back-up memory also includes a last relevant sequence number LRSN table of the most recently registered sub-command for each of the nodes.

The LRSN Table is continuously updated for each of the nodes as regards the sequence number of the last sub-commands stored in a register for the relevant unit or for the network. Thus, any hardware faults occurring during operational maintenance OM are reliably prevented from causing an OM command consisting of a sequence of sub-commands from not or not wholly being effected.

The manner in which the central back-up memory in accordance with the invention can be used in a telecommunication network will now be described in greater detail by way of example with reference to the accompanying drawing.

DETAILED DESCRIPTION OF THE PREFERRED EMBODIMENTS

Figure 1:
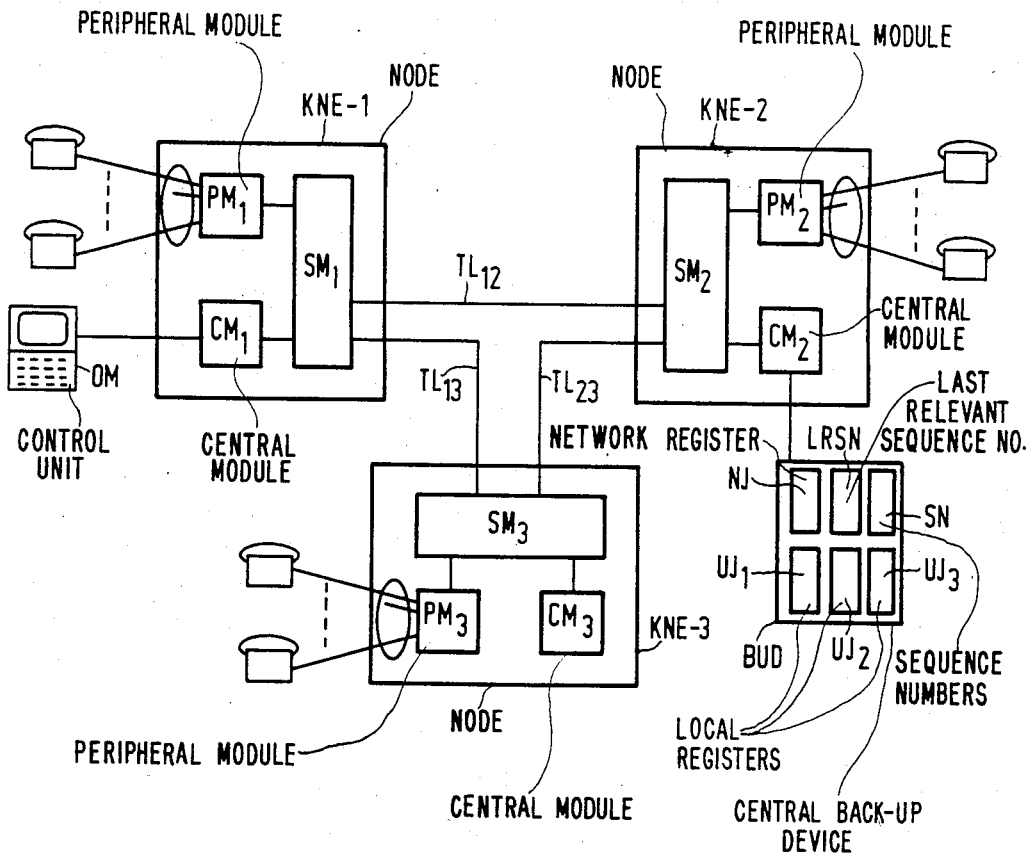
FIG. 1 is a general block circuit diagram of a telecommunication network, more specifically a telephone network of the type according to the invention, for private use.

A network of the general type shown in FIG. 1 is described in greater detail in Philips Telecommunication Review, Vol. 43, No. 2, 1985, and is generally composed of a set of nodes KNE-1,2,3,..., n whose number is chosen optionally and which are coupled to each other by means of transmission lines allowing TDM transmission. More specifically 2 Mb/s transmission lines can, for example, be used for this purpose which can accommodate, for example, 30 PCM-channels through which mutual communication between the nodes can be effected. These nodes may be distributed over an optionally chosen geographical area, such as, for example, a company, a town, provinces, etc., depending on the needs; for example, a large company having several regional branches for which such a telecommunication network is available in its totality.

Each node, more specifically a PABX, comprises a switching module SM, a central module CM and at least one peripheral module PM. The switching module includes a digital non-blocking switching matrix and provisions for providing clock signalling for PCM-transmission. The central module performs the control functions required for the node itself and also the communication with other nodes. A peripheral module performs preprocessing functions, for example, signalling conversions, for a group of, for example, 128 user ports.

For the communication with installations which, with respect to such a relevant node, can be considered as being external, such a node may include interfaces for analogue transmission lines constituting a coupling to public telephone switching systems, for analogue coupling lines to other PBAX-systems, and for PCM-30 digital lines constituting a coupling to public networks and to networks for private usage.

Each node of such a telecommunication network, three of which are shown in the Figure, is self-contained, the facilities are transparent throughout the overall network and a fully free numbering is provided. The data incorporated in the system can generally be divided into local data which are specific of a relevant node, and network data having a more general character and being the same as regards their contents for the relevant nodes. In order to ensure data integrity for the overall network, an updating means is provided for the stock of network data stored in each node.

For the sake of completeness, it should be noted that the configuration of a communication network of the type to which the invention relates, can be chosen optionally. Depending on the needs, such a configuration may be in the form of a star, a mesh or a combination thereof.

By way of example let it be assumed that in the network shown in the Figure an OM-control unit is connected to KNE-1 and that a central back-up device (BUD) according to the invention is connected to KNE-2. However, the fact is stressed that both the location in which the OM-control unit is connected and the location of the central back-up device can be chosen in the network without any restrictions for each of the KNE's. At the same time, in the description of the embodiment, it will be assumed that, using an operational maintenance command formed by a sequence of sub-commands, a change in the stored data must be effected in KNE-3.

As the Figure shows schematically, the back-up memory BUD includes a network register NJ and three local registers (unit-journals UJ), $UJ_1$, $UJ_2$, and $UJ_3$ for the respective nodes KNE-1, 2 and 3. In addition, the BUD includes a Table SN of sequence numbers and a Table LRSN containing the last relevant sequence number of each of the nodes.

If now by means of the OM-control unit a command intended for KNE-3 is supplied, the command consisting of a sequence of sub-commands which may relate both to changing the network data and to changing the local data, this OM command first transfers a request from KNE-1 to KNE-2 via the transmission line $TL_{12}$ and from KNE-1 to the BUD via the central module $CM_2$ to open the SN Table. If this request is complied with, the sequence of sub-commands is thereafter transferred from KNE-1 to the BUD. To any sub-command incoming into the BUD its own sequence number is immediately assigned from the SN-Table, which number is unique in the total overall network. This number is transferred via KNE-2, $TL_{12}$, and KNE-1 to the O control unit and stored there. Each SN for a sub-command is transnferred to the OM control unit together with the LRSN from the LRSN Table in the BUD, the LRSN being associated with the node for which the sub-command is intended. After each sub-command received, the LRSN for the relevant node, or for all the units in the case in which the command is intended for the entire network, is updated.

For each SN received by the OM control unit the simultaneously received LRSN is also stored. Thus, the OM control unit knows the SN and LRSN for each sub-command, after the entire sequence of sub-commands have been transferred to the BUD. After the entire sequence of sub-commands have been transferred from the OM control unit to the BUD, the OM control unit instructs the BUD to lose the SN Table. Thereafter the sub-command can be transferred to KNE-3 for changing data in this node by means of those sub-commands.

When each sub-command is transferred to the KNE-3 the associated SN and LRSN are simultaneously transferred with this sub-command.

Before KNE-3 executes the sub-command, the unit first checks at comparing member 202 whether the sequence number SN of the last sequence number LSN received by KNE-3, this LSN being stored in a memory 201 associated with the central module, is equal to the LRSN received together with the new sub-command. If LSN=LRSN this implies that for KNE-3 no sub-commands have been lost, so that this sub-command can be executed. After execution of the sub-commands the LSN is replaced in the memory of the central module of KNE-3 by the SN of the sub-command just executed.

Figure 2:
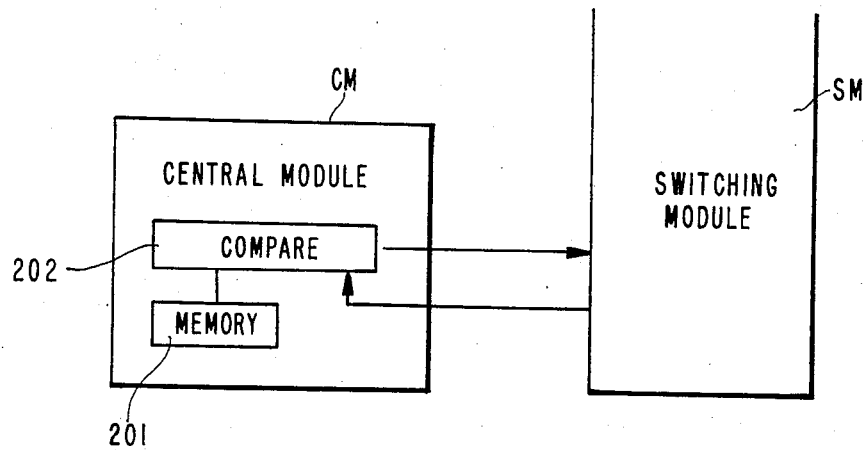
FIG. 2 shows more detail of one of the nodes of FIG. 1.

The features shown in FIG. 2 may be present in all of the nodes.

If LSN≠LRSN, KNE-3 refuses to execute the sub-command and of course does then not change the LSN stored in the memory of the central module, as obviously the connection $LT_{13}$ between KNE-1 and KNE-3 or KNE-3 itself has been non-operational during some time. KNE-3 now sends a request to the BUD for sending from NL and/or UJ3 all the sub-commands having a SN higher than the LSN. In reply to this request the BUD sends to KNE-3 all the sub-commands having a SN>LSN from the register for KNE-3 (UJ3) and possibly from the network register (NJ), the sub-commands being sent in a sequence of increasing sequence numbers. In this way all the sub-commands are indeed received in the appropriate sequence by KNE-3 for execution, so that there is no risk of inconsistency in the data file of the network.

What is claimed is:

1. A telecommunication network, more specifically a telephony network comprising:
    a. a plurality of nodes which are coupled to each other by means of transmission lines, each node comprising:
        i. a switching module,
        ii. a central module, and
        iii. at least one peripheral module to which user ports can be connected, and
    b. a control unit for operational maintenance coupled to one of the nodes, which control unit supplies an operational maintenance command including a sequence of sub-commands for changing data in one or more of the nodes,
    c. a central back-up memory, coupled to one of the nodes, including:
        i. a network register for sub-commands intended for all of the nodes, and
        ii. a plurality of respective local registers, one for each of the nodes, for storing sub-commands intended for respective nodes the central back-up memory storing the sequence of sub-commands in either the network register or in one or more of the local registers as soon as the control unit supplies the operational maintenance command and before the sequence of sub-commands change the data in the nodes.

2. A telecommunication network comprising:
   a. a plurality of nodes, each node comprising:
      i. a respective switching module;
      ii. a respective central module; and
      iii. at least one respective peripheral module to which user ports can be connected;
   b. a plurality of transmission lines coupling the nodes together;
   c. a control unit, coupled to one of the nodes, the unit supplying an operational maintenance command which includes a sequence of sub-commands for changing data in one or more nodes in the network; and
   d. a central back-up memory, coupled to one of the nodes, and including:
      i. a network register for sub-commands common to all nodes of the network; and
      ii. a plurality of respective local registers for storing specific sub-commands intended for respective ones of the nodes, the specific sub-commands being stored in the respective local registers as soon as the control unit supplies the operational maintenance command and before the specific sub-commands are transferred to the respective nodes.

3. The network of claim 2 wherein the network is a telephony network.

4. The network of claim 2 wherein the central back-up memory further comprises:
   a. a sequence number table, from which a unique sequence number is assigned to each sub-command to be stored either in the network register or in one of the local registers; and
   b. a last relevant sequence number table for sub-commands last registered for each of the nodes.

5. The network of claim 4 wherein each node comprises respective means for storing the sequence number of the sub-command last performed by that node.

6. The network of claim 5 wherein
   a. each sub-command is transmitted from the central back-up memory to an intended node together with the respective sequence number of the sub-command and the sequence number of the sub-command last registered for the intended node in the last relevant sequence number table; and
   b. each respective node comprises
      i. a respective input means for receiving sub-commands, respective sequence numbers of received sub-commands, and sequence numbers last registered for the respective node from the last relevant sequence number table;
      ii. means for comparing a received sequence number last registered for the respective node with the last sequence number stored in the respective storing means.

7. The network of claim 6 wherein:
an executing node, responsive to a result of a comparison performed by the comparing means,
   a. executes a received sub-command when the last sequence number stored in the respective storing means is the same as the received sequence number last registered for the executing node; and
   b. after executing the received sub-command, stores the respective sequence number of the received sub-command in the respective storing means in the executing node.

8. The network of claim 6 wherein
   a. a refusing node, responsive to a result of a comparison performed by the comparing means, refuses a received sub-command when the last sequence number stored in the respective storing means is not the same as the received sequence number last registered for the refusing node; and
   b. the central back-up memory, responsive to a refusal of the received sub-command, transfers to the refusing node all sub-commands which are
      i. intended for the respective refusing node; and
      ii. have respective sequence numbers greater than the sequence number last registered for the refusing node.

9. The network of claim 6 wherein
   a. each respective node, responsive to a result of a comparison performed by the comparing means, either:
      i.
         A. executes a received sub-command when the last sequence number stored in the respective storing means is the same as the received sequence number last registered for the respective node; and
         B. after executing the received sub-command, stores the respective sequence number of the received sub-command in the respective storing means in the respective node; or
      ii. refuses a received sub-command when the last sequence number stored in the respective storing means is not the same as the received sequence number last registered for the respective node; and
   b. the central back-up memory, responsive to a refusal of the received sub-command, transfers to any node refusing a received sub-command all sub-commands which are
      i. intended for the node refusing the received sub-command; and
      ii. have respective sequence numbers greater than the sequence number last registered for the refusing node.

10. The network of claim 2 wherein the control unit and the central backup memory are both selectably connectable to any of the nodes.

11. The network of claim 4 wherein the control unit and the central backup memory are both selectably connectable to any of the nodes.

12. The network of claim 9 wherein the control unit and the central backup memory are both selectably connectable to any of the nodes.

13. Apparatus for use as a node in a telecommunication system which system includes:
   a. a plurality of similar nodes, coupled together in a network;
   b. a control unit, which is selectably connectable either to the apparatus or one of the similar nodes, the control unit supplying an operational maintenance command which includes a sequence of sub-commands for changing data in one or more nodes in the network; and
   c. a central back-up memory, which is selectably connectable either to the apparatus or one of the similar nodes, which central back-up memory includes:

i. a network register for sub-commands common to all nodes of the network; and
ii. a plurality of respective local registers for storing specific sub-commands intended for respective ones of the nodes, the specific sub-commands being stored in the respective local registers as soon as the control unit supplies the operational maintenance command and before the specific sub-commands are transferred to the respective nodes;

the apparatus comprising:
a. a respective switching module;
b. a respective central module; and
c. at least one respective peripheral module to which user ports can be connected.

14. The apparatus of claim 13 wherein the system is a telephony network.

15. The apparatus of claim 13 wherein the central back-up memory includes:
a. a sequence number table, from which a unique sequence number is assigned to each sub-command to be stored either in the network register or in one of the local registers; and
b. a last relevant sequence number table for sub-commands last registered for each of the nodes; and wherein the apparatus comprises:
c. means for storing the sequence number of the sub-command last performed by the apparatus.

16. The apparatus of claim 15 wherein
a. each sub-command is transmitted from the central back-up memory to an intended node together with the respective sequence number of the sub-command and the sequence number of the sub-command last registered for the node in the last relevant sequence number table; and
b. the apparatus further comprises
i. input means for receiving sub-commands, respective sequence numbers of received sub-commands, and sequence numbers last registered for the apparatus from the last relevant sequence number table;
ii. means for comparing a received sequence number last registered for the apparatus with the last sequence number stored in the storing means.

17. The apparatus of claim 16 wherein, responsive to a result of a comparison performed by the comparing means, the apparatus
a. executes a received sub-command when the last sequence number stored in the storing means is the same as the received sequence number last registered for the apparatus; and
b. after executing the received sub-command, stores the respective sequence number of the received sub-command in the storing means.

18. The apparatus of claim 16 wherein, responsive to a result of a comparison performed by the comparing means, the apparatus refuses a received sub-command when the last sequence number stored in the respective storing means is not the same as the received sequence number last registered for the refusing node; and wherein the central back-up memory, responsive to a refusal of the received sub-command, transfers to the apparatus all sub-commands which are
i. intended for the apparatus; and
ii. have respective sequence numbers greater than the sequence number last registered for the apparatus.

19. The apparatus of claim 16 wherein
a. the apparatus, responsive to a result of a comparison performed by the comparing means, either:
i.
A. executes a received sub-command when the last sequence number stored in the storing means is the same as the received sequence number last registered for the apparatus; and
B. after executing the received sub-command, stores the respective sequence number of the received sub-command in the storing means in the apparatus; or
ii. refuses a received sub-command when the last sequence number stored in the storing means is not the same as the received sequence number last registered for the apparatus; and
b. the central back-up memory, responsive to a refusal of the received sub-command, transfers to the apparatus all sub-commands which are
i. intended for the apparatus; and
ii. have respective sequence numbers greater than the sequence number last registered for the apparatus.

* * * * *